Aug. 6, 1957
W. L. HARKESS ET AL
2,801,774
PACKAGING MACHINE
Filed May 27, 1954
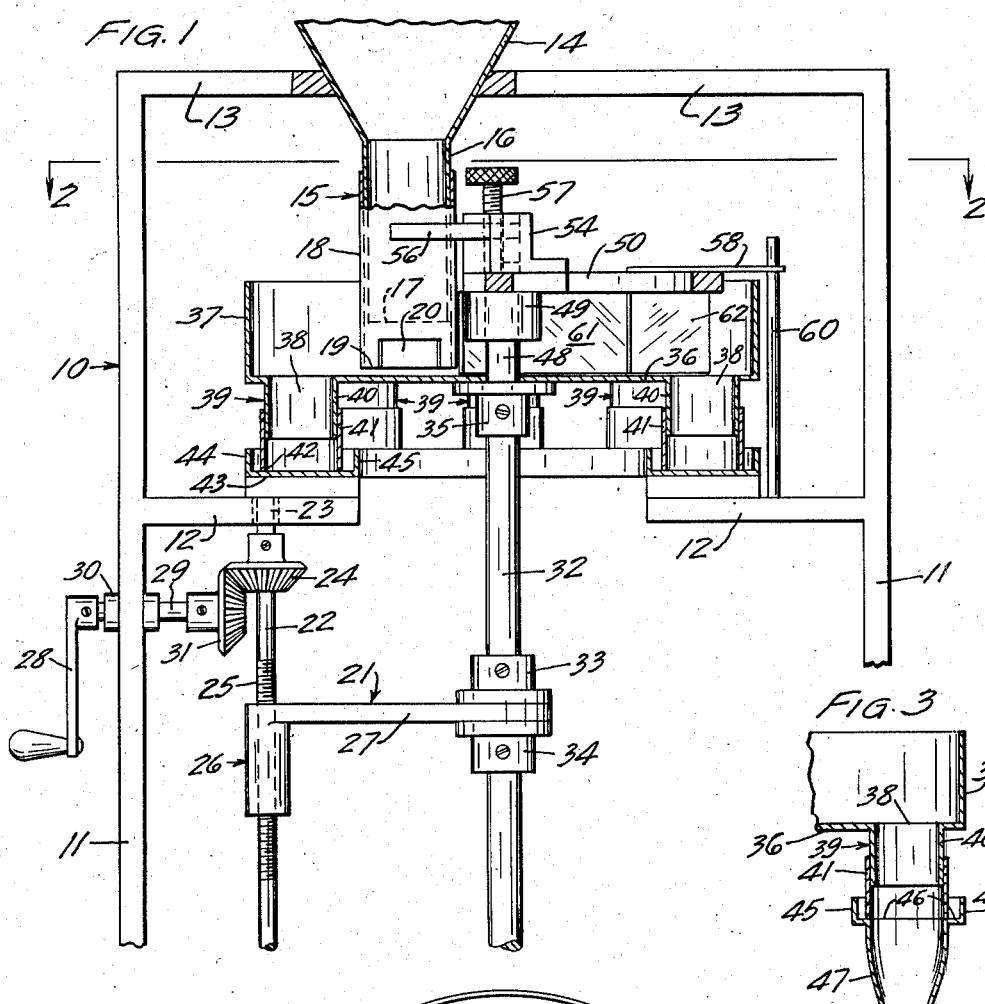
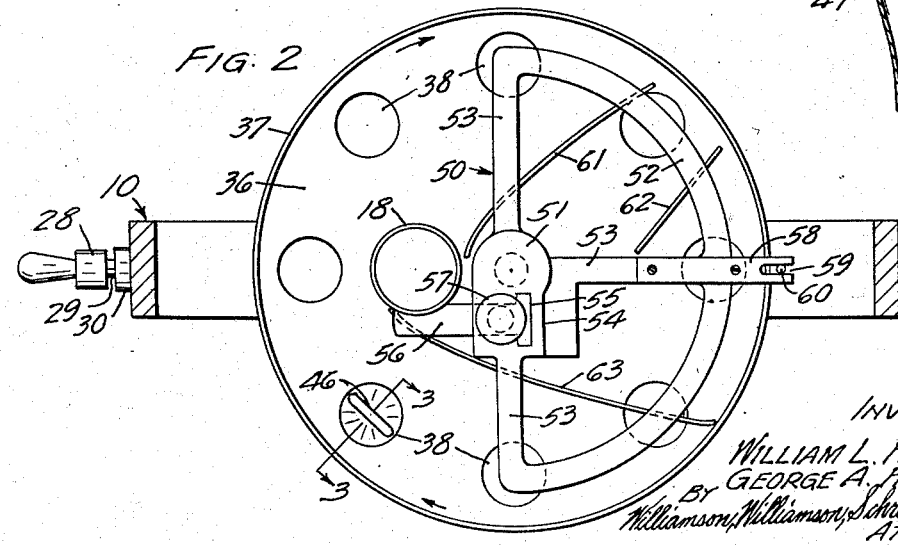
INVENTOR
WILLIAM L. HARKESS
GEORGE A. HARKESS
BY Williamson, Williamson, Schroeder & Adams
ATTORNEYS United States Patent Office 2,801,774
Patented Aug. 6, 1957

2,801,774

PACKAGING MACHINE

William L. Harkess and George A. Harkess,
Minneapolis, Minn.

Application May 27, 1954, Serial No. 432,694

3 Claims. (Cl. 222—226)

This invention relates to a packaging machine and more particularly to an apparatus for measuring and delivering predetermined quantities of dry granular material to individual packages.

The packaging art is replete with devices for measuring and filling packages or containers with prescribed quantities of material. Since the sale of bulk material has diminished greatly in favor of prepackaged material and because laws have become more stringent regarding accurate measurement of goods sold, it has become more and more important to provide packaging equipment which will be uniform and accurate in operation.

Most powdered or granular dry material is sold to the public by weight and the containers are so marked. In some instances it is recognized that the material may shrink as by evaporation of water content and hence it is required that the weight when packaged be specified on the label or outside of the container, but usually the greater number of devices for measuring and packaging such materials physically weigh the material by means of scale equipment before it is placed in each container. Sometimes an approximate amount of the material is dumped into the package and the balance is trimmed so as to acquire the requisite measured amount in each package or container within the limits of error permitted.

In a few instances it has been proposed that material be measured by volume to acquire the weight desired. In all those instances of which we are aware it is attempted to gain uniformity by vibrating, shaking, jolting or the like to compact the material in a measuring container. The material is then struck off or allowed to spill from the sides of the measuring container during the compacting operation. Slight changes in moisture content, lack of uniformity in striking off the top of the material, and variations in compacting through vibrating and the like all result in deviations from accuracy and uniformity in the weight of each batch of material so measured. The tendency in recent times has been away from volumetric methods in obtaining accurate weight of material in filling equipment.

In the present invention, however, we have been able to utilize the fast and simple volumetric method of measuring bulk materials to obtain unexpectedly accurate weights for duplicate quantities of dry granular material such as coffee and we have consistently maintained accuracy to within one-hundredth of an ounce when measuring and filling three ounce containers.

It is therefore an important object of the invention to provide an apparatus which will efficiently measure quantities of dry material in powdered or granular form which will maintain uniform density of the material during measuring and thereby result in accurate duplication of weight from one quantity to the next.

It is another object of the invention to provide a volumetric filling apparatus in which the amount of material in a hopper and consequent variations in compacting of the material by virtue of the weight disposed therein will not affect the density of the material as it is measured.

It is a further object to measure dry material of the class described with little if any compaction from vibrating, jolting or the like, the material rather being uniformly fed laterally from a surface in small and loose quantities into volumetric measuring means where it is accurately struck off in uncompacted condition.

Another object is to provide an apparatus for volumetric measuring of material where novel adjusting means will quickly change the volume of the batch quantities of material delivered while maintaining the adjusted relationship between parts of the feeding mechanism.

It is a still further object of the invention to provide packaging apparatus in which material is fed indirectly from a feed passage to a surface from which the material is then guided into volumetric collector means, the excess material being returned to the feed passage outlet for choking back excess feed and thereby regulating automatically within limits the proper feeding of material to the device.

These and other objects and advantages of our invention will more fully appear from the following description made in connection with the accompanying drawings wherein like reference characters refer to similar parts throughout the several views and in which:

Fig. 1 is a side elevation of our packaging equipment, parts thereof being shown in vertical section and parts thereof in full line with unessential portions deleted from the view;

Fig. 2 is a horizontal section of the device taken on the line 2—2 of Fig. 1 and looking in the direction of the arrows; and Fig. 3 is a vertical section of a segmented portion of the discharge spout taken on the line 3—3 of Fig. 2.

Referring now more particularly to the drawing, a supporting frame structure is indicated generally by the numeral 10, the framework comprising legs 11, cross braces 12 and hopper supporting members 13 as shown in Fig. 1. The lower supporting portion of the framework 10 is not considered important to this invention and hence is not illustrated. Secured rigidly to the upper members 13 of framework 10 is a bin or hopper 14 which terminates at its lower end in a feed passage or spout 15 as shown generally in Fig. 1. The feed passage 15 in turn comprises a rigid spout member 16 having communication with the bin or hopper 14 and terminating in a lower edge 17. A sleeve 18 is slidably mounted upon the spout 16 and terminates in a lower edge 19 as shown in Fig. 1. The feed passage or spout 15 thus becomes extensible in nature with respect to the hopper 14, all the while maintaining free passageway from the hopper to the lower edge 19. The lower extensible portion is preferably cylindrical with the rigid spout 16 and has a horizontal lower edge 19 evenly disposed around the circumference except for an entranceway 20 created by a recess or notch in the extensible sleeve portion 18 as shown in Fig. 1. The use and purpose of the entranceway 20 will be set forth later in this specification.

Also secured to the framework 10 is a supporting and adjusting mechanism 21 which in turn comprises a vertical screw shaft 22. The vertical screw shaft is journaled at its upper end 23 in the brace 12 and may be journaled at a lower position to another portion of the framework 10 (not shown). A beveled gear 24 is secured to the shaft 22 and a length 25 of the shart 22 is threaded so as to receive a corresponding threaded shank portion 26 of the arm 27. A crank member 28 is secured to a shaft 29 which in turn is journaled at 30 to a portion of frame 10. The shaft 29 bears at its inner end a beveled gear 31 which is adapted to intermesh with the beveled gear 24. When the crank 28 is rotated manually, the shank 26 and arm 27 are caused to move in a vertical direction.

A central supporting shaft 32 is journaled for rotation through the arm 27 and the collars 33 and 34 prevent endwise relative movement of shaft 32 with respect to arm 27. The arm 32 may however be vertically adjusted through movement of shank 26 and arm 27 while maintaining the rotatability of shaft 32 on its vertical axis. Means, not shown, are provided to impart rotation of the shaft 32 and such means may constitute any normal driving mechanism such as gears, belts or direct drive from a power source.

The vertical shaft 32 has a flange collar 35 secured thereto for rotation and a member with a receiving surface 36 is also secured to the shaft 32 and collar 35 for rotation therewith. The receiving surface 36 may be in the form of a circular pan having an upstanding peripheral edge flange 37 and further provided with one or more openings 38 formed through the surface 36 as shown in Figs. 1 and 2.

Open-ended volumetric collector means are secured beneath the receiving surface 36 and in registry with opening 38 so as to have open communication through said surface in order to facilitate the measuring and filling of containers. It is preferred to use a plurality of the volumetric collectors and in the instant case eight such open-ended volumetric collectors are employed in spaced relation, each being indicated generally at 39. Each of the open-ended volumetric collectors 39 is extensible so as to vary the encompassed volume when so desired. The collector is therefore divided into a rigid tubular portion 40 which may be welded or otherwise attached beneath the receiving surface 36 and in such a way as to register with opening 38. A slidable sleeve member 41 is mounted upon the tubular portion 40 and terminates at its lower end in a circumferential edge 42 which is transverse to the longitudinal disposition of the volumetric collectors 39. The lower edge 42 of sleeve member 41 is permitted to ride upon an annular surface 43 which provides a closing means for the volumetric collector 39. The surface 43 may have upstanding annular flanges 44 and 45 so as to form a flat brace with the annular surface 43. Each of the volumetric collectors 39 has its lower extensible edge in contact with the surface 43 during the entire revolution of shaft 32. The end-closing surface 43 has an opening 46 slightly smaller than the circumference of sleeve 41, the opening being visible from the top of the receiving surface 36 as shown in Fig. 2. Immediately beneath the opening 46 is a delivery spout 47 which in turn is secured to the annular surface 43 in registry with the opening as shown in detail in Fig. 3. It is to be observed that since the end-closing annular surface 43 is rigidly secured to frame 10, the vertical adjustment of shaft 32 together with collar 35 and receiving surface 36 will permit the extending or retracting of the volumetric collector means 39 and consequently vary the volume of each of the collectors uniformly.

The upper end 48 of shaft 32 terminates in a thrust bearing 49 which in turn is rigidly secured to a spider 50 as shown in Figs. 1 and 2. The spider 50 has a central hub 51 and a semi-circular outer portion 52 secured in turn to arms 53 as shown in Fig. 2. A boss 54 is formed on spider 50 and has a T-shaped vertical slot 55 which slidably receives an interconnecting support 56 which in turn is rigidly secured to the feed spout sleeve 18 as shown in Figs. 1 and 2. An adjusting screw 57 is threadably received by the support 56 so as to allow the end of screw 57 to bear upon the bottom of the recess guide 55 in boss 54. The adjusting screw 57 will thus raise and lower the sleeve 18 with respect to the shaft 32 and hence with respect to the receiving surface 36. An extension arm 58 is secured to the spider 50 and terminates outwardly in a guide slot 59 as shown in Fig. 2. The guide slot 59 is adapted to receive a rigid vertical rod 60 which in turn is secured at its lower end to the cross arm 12 of frame 10. The slotted arm 58 prevents rotation of the spider member by virtue of any friction between the upper end 48 of shaft 32 and the thrust bearing 49.

Distributor means are secured to the spider 50 for causing bulk granular or powdered material to be moved across the receiving surface into the volumetric collectors. The distributor means comprise a series of bladed elements disposed vertically in connected relation to the spider 50 as shown in Figs. 1 and 2. The first distributor blade 61 is disposed as shown in Fig. 2 and extends downwardly in contact or very close clearance with the receiving surface 36. The blade has a deviation from the radial so as to cause material to move outwardly therealong when the receiving surface or pan rotates in the direction of the arrow as shown in Fig. 2. It will be noted that the outer end of distributor blade 61 covers the projected path of each of the openings 38 but terminates at the outer peripheral flange 37 of the receiving pan 36. A second distributor blade 62 is similarly attached to the underside of spider 50 and likewise is in contact or in close clearance with the receiving bottom of pan 36. The angulation of blade 62 is opposed to that of blade 61 and the outer end thereof is in closer clearance with flange 37. The second distributor blade 62 tends to pull excess bulk material inwardly toward the medial portion of pan surface 36. A third distributor blade 63 is likewise secured to the underside of spider 50 and likewise is in contact with or in close clearance with the receiving pan 36. The outer end of blade 63 is in contact with or in close clearance with the peripheral flange 37 as shown in Fig. 2. The angulation of the distributor blade 63 is such that material tends to move inwardly therealong when the pan surface 36 rotates in the direction of the arrow. All excess bulk material which is not deposited in the volumetric collectors 39 will thus move inwardly along blade 13 and be piled against the leading entranceway 20 in sleeve 18 and hence will tend to re-enter the feed passage or spout 15 during operation of the machine.

In the use and operation of our packaging machine a quantity of dry material in granulated or powdered form is placed in the hopper 14 and no particular concern need be given the amount of head created by the weight of material in the hopper since compacting of the material at this point does not affect the subsequent measuring thereof in our apparatus. The central shaft 32 is caused to rotate and as a consequence thereof the receiving pan together with its attached volumetric collectors 39 will rotate circularly underneath the fixed hopper 14. Material will then be picked up by receiving surface 36 as it is passing in relative movement with the sleeve member 18. The material will be distributed in a thin layer at a medial area of the receiving surface 36 from which it will be picked up by the first distributor blade 61 and moved outwardly into the pathway of the openings 38 in registry with volumetric collectors 39. The volumetric collectors will be substantially filled at this point by loose material which has been worked and turned so as to relieve any compaction previously occurring by virtue of the head of material in the hopper 14. That portion of the material which has formed a pile at the outer flange 37 is then partially returned against distributor blade 62 so as to lie in a medial area of receiving surface 36. The remainder of the material plowed against the outer peripheral flange 37 is finally picked up by the distributor blade 63 and caused to be moved over the projected path of the volumetric collectors and simultaneously the third blade 63 will strike off the top of each of the volumetric containers flush with the surface 36. Each of the volumetric collectors thus moves to the position in Fig. 2 over the opening 46 and delivery spout 47 where it will be discharged for filling into a package or container in precise volumetric quantity. Since the material has been handled in a particular way to obviate variations in density from compaction, the exact volumetric measurement will likewise give a substantially exact weight of material. Thus we can measure such materials as coffee which is required to be specified in terms of weight, by volumetric means, yet obtaining results within the limits of error permitted.

When it is desired to change the volumetric measurement to a new value the crank 28 is turned in the appropriate direction so as to move the shaft 32 vertically. Sleeve members 41 on the volumetric collectors will then be permitted to move vertically to vary the volume of the collector while still maintaining sliding contact with the annular surface 43. It will be noted that raising the shaft 32 will automatically raise the entire spider assembly 50 and hence will raise the sleeve 18 of the feed spout 15 so as to maintain a constant clearance between the lower edge 19 and the upper surface 36.

Now, when it is desired to speed up or slow down the rate of feed from hopper 14 to the receiving surface 46 the adjusting screw 57 is advanced or retracted as required to vary the individual clearance between the edge 19 and receiving surface 36. As previously pointed out it is not necessary to acquire the exact clearance between sleeve 18 and surface 36 which will permit feeding the exact quantity of material to the volumetric collectors 39. It is only necessary that a slight excess be maintained in the feed, the excess being returned to the entranceway 20 of sleeve 18 and creating a choking effect which will slow down and automatically adjust the rate of feed from hopper 14.

It may thus be seen that we have devised a simple and effective machine which will produce accurate weight results by volumetric means, the adjustment and variation of condition for dry powdered or granular material being easily effected to achieve the desired results.

It will, of course, be understood that various changes may be made in the form, details, arrangement and proportions of the parts without departing from the scope of our invention which consists of the matter shown and described herein and set forth in the appended claims.

What we claim is:

1. A packaging machine for dry granular and powdered material comprising, a material supply having a downward feed passage, a receiving surface disposed beneath said feed passage and movable relatively thereto in a transverse direction, said feed passage terminating downwardly in spaced clearance with the receiving surface and having a trailing terminal portion for permitting material to be deposited on said surface and further having an entranceway at a leading portion of the downward terminus for return of excess material and consequent automatic choking and retarding of the rate of deposit of material upon said surface, an open-ended volumetric collector means secured beneath said surface and having open communication therethrough at a position out of alignment with said feed passage for permitting indirect flow of material therebetween, a distributor element for moving material from a position on said surface directly beneath said feed passage laterally to the open communication with said volumetric collector means, means closing the lower open end of said collector, and means operable to permit discharging a batch of dry material therefrom, said batch of material having a predetermined volume and density.

2. A packaging machine for dry granular and powdered material comprising, a material supply having a downward feed passage, a portion of said feed passage having downward extensibility, a receiving surface disposed beneath said extensible portion and movable in endless fashion relatively thereto in a transverse direction, said extensible portion being adapted to terminate downwardly in adjustably spaced clearance with said receiving surface, and having a trailing terminal portion for permitting material to be deposited on said surface and having an entranceway at a leading portion thereof for return of excess material and consequent automatic choking and retarding of the rate of deposit of material upon said surface.

3. A packaging machine for dry granular and powdered material comprising, a material supply having a downward feed passage, a portion of said feed passage terminating downwardly in a feed opening and being vertically extensible and retractable, a receiving surface disposed beneath said feed opening of the extensible and retractable portion and movable relatively thereto in a transverse direction, an open-ended volumetric collector means secured with respect to said surface in underlying relation and having open communication through said surface in a position to one side of said feed opening for permitting flow of material indirectly therebetween, said volumetric collector means having an adjustable sleeve portion for adjusting the predetermined volume of the collector means, means closing the lower open end of said collector means and operable through relative transverse movement therebetween, to permit discharging a batch of dry material from said collector means, said extensible and retractable portion of the feed passage having adjustable fixed relation with said receiving surface and being simultaneously movable therewith in a vertical direction to adjust the volume of said collector means while maintaining adjusted clearance between said feed opening and said receiving surface.

References Cited in the file of this patent

UNITED STATES PATENTS

| 437,093 | Cashin | Sept. 23, 1890 |
| 570,108 | Smyser | Oct. 27, 1896 |
| 893,583 | Hey et al. | July 14, 1908 |
| 897,420 | Small | Sept. 1, 1908 |
| 1,300,274 | Jefferies et al. | Apr. 15, 1919 |
| 1,944,381 | Wamhoff | Jan. 23, 1934 |
| 2,315,866 | McBean | Apr. 6, 1943 |
| 2,320,581 | First et al. | June 1, 1943 |
| 2,606,693 | Phillips | Aug. 12, 1952 |